R. T. Smith.
Transmitting Motive Power.

Nº 59,089.          Patented Oct 23. 1866.

Witnesses:
F A Jackson
Wm Truin

Inventor:
R. T. Smith
Per Munn & Co
Attorneys

UNITED STATES PATENT OFFICE.

R. T. SMITH, OF NASHUA, NEW HAMPSHIRE.

IMPROVEMENT IN TRANSMITTING MOTIVE POWER.

Specification forming part of Letters Patent No. 59,089, dated October 23, 1866.

*To all whom it may concern:*

Be it known that I, R. T. SMITH, of Nashua, in the county of Hillsborough and State of New Hampshire, have invented a new and useful Improvement in Transmitting Motive Power; and I do hereby declare that the following is a full, clear, and exact description thereof, which will enable others skilled in the art to make and use the same, reference being had to the accompanying drawings, forming a part of this specification, in which—

Figure 1:
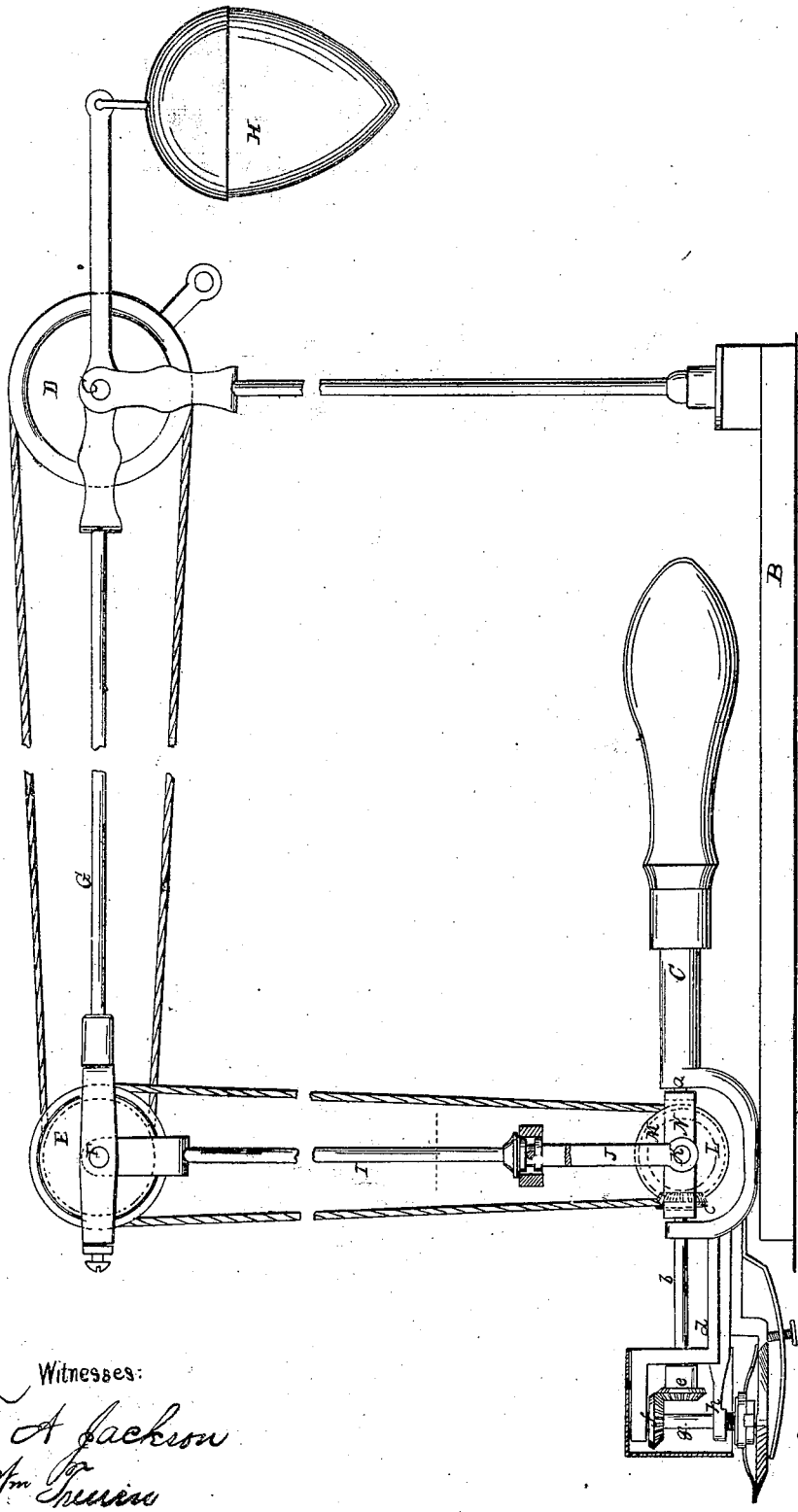
Figure 2:
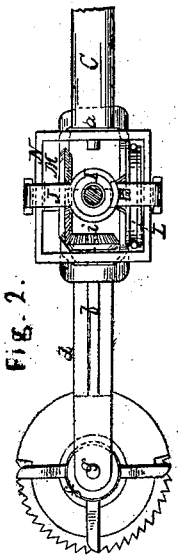

Figure 1 represents a sectional side elevation of this invention. Fig. 2 is a horizontal section of the same.

Similar letters of reference indicate like parts.

This invention relates to a device intended to transmit motive power from a revolving shaft to a revolving cutter or brush, or to any other article which is secured to a handle, and arranged, in combination with a universal joint, in such a manner that said handle, together with the brush, cutter, or other article, can be freely turned in either direction without interfering with the motion of said brush, cutter, or other article, or with any part of the mechanism which serves to transmit the power from the revolving shaft to said brush, cutter, or other article.

A represents a standard which rises from a bed-plate, B, and the upper bifurcated end of which forms the bearing for a shaft, C, to which a revolving motion is imparted by a hand-crank or any other suitable motive power.

On the shaft C is mounted a pulley, D, from which the motion is transmitted by a belt and pulley, E, to a shaft, F, which has its bearings in the bifurcated end of a rod, G. This rod swings freely on the shaft C as a center, so that the pulley E can be carried all round the pulley D without disturbing the belt stretched over said pulleys, and said rod extends beyond the shaft C to receive a balance-weight, H, as shown in Fig. 1 of the drawings.

From the shaft F is suspended a rod, I, the lower end of which is connected to a stirrup, J, so that said stirrup is free to swivel on the rod, being retained by a set-screw which catches in an annular groove in the bottom end of the rod, as shown in Fig. 1; or the connection may be effected by other suitable means.

The stirrup J forms the bearings for a shaft, K, on which is mounted a pulley, L, and a bevel-wheel, M, and which also supports a cage, N, that is situated between the arms of the stirrup, as seen particularly in Fig. 2.

From one end of the cage extends a pin, $a$, and from the other a shaft, $b$, which serve to support the handle O, the end of which is so shaped that it straddles the cage N, as shown in Fig. 1.

On one end of the shaft $b$ is mounted a bevel-wheel, $c$, which gears in the bevel-wheel M, and its other end has its bearing in a Z-shaped arm, $d$, which extends from the end of the handle O. On this end of the shaft $b$ is secured a bevel-wheel, $e$, which gears in another bevel-wheel, $f$, mounted on a shaft, $g$, which has its bearings at one end in the Z-shaped arm, and at the opposite end is a bracket, $h$, secured to said arm. This shaft bears the brush, cutters, or other articles to which motion is to be imparted.

It must be remarked that the handle O, instead of being made to extend in a direction opposite to the Z-shaped arm, might be connected to said arm, and the motion might be transmitted from the shaft K to the shaft $g$ by pulleys and belts, or any other means, instead of those shown in the drawings.

By this arrangement the handle, together with the brush, cutter, or other article, can be freely moved in either direction. It can be turned, raised, or lowered without interrupting its connection with the motive power, and a device is obtained which can be used with great advantage for giving motion to a brush in currying horses, or to a cutter in a sheep-shearing machine, or to other parts of machines of a similar nature.

If desired, the standard A may be made to swivel in its socket, or it may be made in two parts, connected by a swivel-joint, whereby still greater freedom of motion would be effected.

I claim as new and desire to secure by Letters Patent—

The swivel-stirrup J, secured to the swinging rod I, in combination with the cage N, handle O, and shaft $g$, carrying the brush, cutter, or other article, and connecting with the shaft K in the stirrup by bevel-gear or other equivalent means, substantially as and for the purpose set forth.

R. T. SMITH.

Witnesses:
W. HAUFF,
ALEX. F. ROBERTS.